March 13, 1951     C. E. GARDNER     2,545,078
EYESHIELD
Filed April 12, 1949
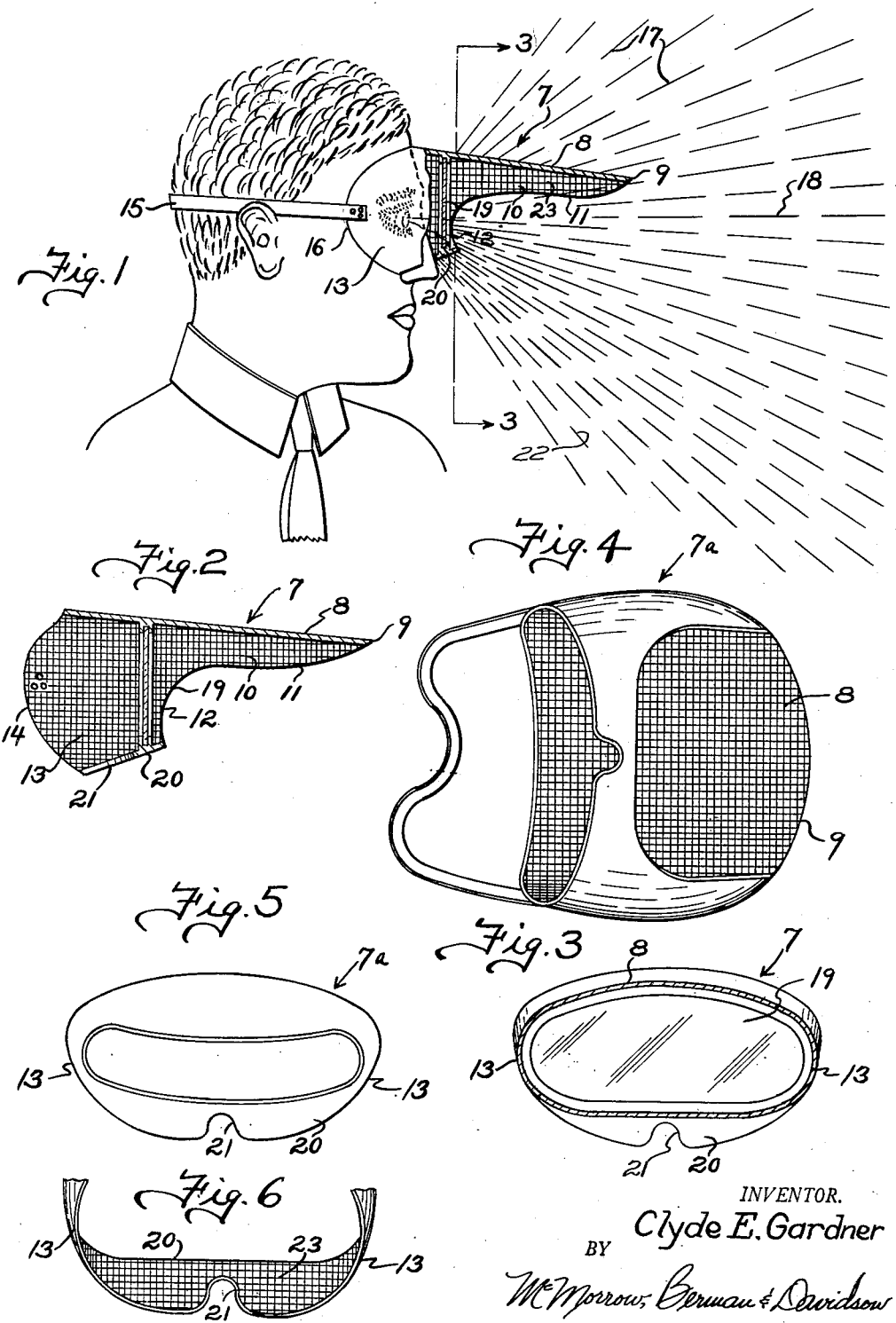
INVENTOR.
Clyde E. Gardner
BY
McMorrow, Berman & Davidson
ATTORNEYS Patented Mar. 13, 1951

2,545,078

UNITED STATES PATENT OFFICE 2,545,078

EYESHIELD

Clyde E. Gardner, Effie, Minn.

Application April 12, 1949, Serial No. 87,043

6 Claims. (Cl. 2—14)

This invention relates to improvements in anti-glare eye shields, and the primary object of the invention is the provision of a novel and more effective device of this character, which, besides eliminating or reducing the glare-effect upon the eyes of the wearer of light rays meeting the eyes from points on a level with and above the level of the eyes, eliminates or reduces also the glare-effect of light rays meeting the eyes from points below the level of the eyes, and from points at the sides of the eyes.

Another important object of the invention is the provision of a device of the above indicated character which eliminates or reduces internal light reflection within the device.

Another important object of the invention is the provision of a device of the above indicated character in which eye lenses may be incorporated if desired, either for purposes of vision correction or for light filtering purposes or both.

Other important objects and advantageous features of the invention will be apparent from the following description and accompanying drawings, wherein, merely for illustrative purposes, specific embodiments of the invention are set forth in detail.

In the drawings:

Figure 1 is a right hand side elevation, showing one embodiment of the invention in place on the head of a wearer, the device being shown partly in vertical longitudinal section.

Figure 2 is a vertical longitudinal section taken through the device shown in Figure 1.

Figure 3 is a vertical transverse section taken therethrough Figure 1 on the line 3—3.

Figure 4 is a bottom plan view of another embodiment constructed without eyeglass.

Figure 5 is a front elevation thereof, and,

Figure 6 is a fragmentary perspective of the lower part of the device, showing part of the area treated to eliminate internal reflection and glare.

Referring in detail to the drawings, two embodiments of the invention are set forth which besides performing the usual functions characteristic of this type of device, of reducing or eliminating glare from the eyes of the wearer produced by light rays originating on a level with and above the level of the eyes, perform the additional function of reducing or eliminating glare from the eyes of wearer produced by light rays originating at or reflected from a level below the eyes, and from different levels at the sides of the eyes. One of the illustrated embodiments incorporates a lens or glass which may be tinted and/or ground for either or both eye correction and anti-glare purposes, the other embodiment being devoid of such a glass or lens.

Referring first to Figures 1 through 3, showing the embodiment incorporating an eye glass or lens, the said embodiment generally designated 7 comprises a light weight, relatively rigid, plastic or other suitable material body, formed to provide, preferably in a single sheet form, a slightly forwardly declining peak portion 8, the full width of the wearer's forehead, and tapering forwardly therefrom to a rounded front edge 9. The peak 8 is curved transversely to provide shallow dependent sides 10 which flare in depth rearwardly providing lower edges 11, which at their rear ends curve downwardly and forwardly, as indicated at 12, where they merge as forward edges of the segmental shaped sides 13, which have rearwardly curved rear edges 14, as shown in Figure 2. The sides 13 are deep enough to reach from the rear part of the peak 8 downwardly along the sides of the wearer's forehead, temples, and cheeks, as shown in Figure 1. A headstrap 15, to encircle the head of the wearer has its forward ends connected at 16 to the rearward extremities of the sides 13. It is obvious that worn as illustrated in Figure 1, the device, so far described above, protects the eyes only from the light rays 17 coming from above eye level.

For protecting the eyes from the horizontal light rays 18, the device may be provided with a glass or lens 19 of suitable optical characteristics, of such as Polaroid or tinted glass, and optically corrective or not, which conforms in shape to the generally oval cross section of the device, as shown in Figure 3, involving the curved peak 8 and the curved sides 13, the lens 19 being secured at its edges to the inner surfaces of the peak and sides at a suitable relatively small distance forwardly from the eyes of the wearer.

The lower inturned edges of the sides 13 merge into a lower shield 20 having a curved notch 21 in its rear edge for conformably engaging and resting upon a lower part of the nose of the wearer, the lower shield acting to protect the eyes of the wearer from the light rays 22 directed upwardly to the eyes from below. As shown in Figure 2, the lower shield 20 is forwardly inclined and terminates at the lower end of the edges 12 of the sides, being only sufficiently wide to intercept the upwardly angulated light rays from reaching the lower vulnerable sides of the eyes without obscuring a wide vertical angle of vision for the wearer.

As shown in the drawing, the inner surfaces of the device may be coated or otherwise treated, as indicated at 23, to reduce or eliminate internal reflection within the device and reduce or eliminate reflection to the eyes of light rays reaching into the device from outside.

In the embodiment of the invention shown in Figures 4, 5 and 6, and generally designated 7a, the lens or glass 19 is absent.

As indicated in Figure 1, the sides 13 may be made transparent to provide free side vision where desired, without doing away with the protective action of the device, and if desired the entire device may be made of translucent material, that is relatively opaque material, except for the lens 19, and in case the device is made of transparent material the inner surfaces of the device would be treated with glare reducing transparent material or the material polarized. The device is preferably made of an opaque dull-black color or other light-absorbing color, or of an opaque material which is colored on its inner surface with a dull-black or other light-absorbing color.

What is claimed is:

1. An eye shield comprising a forwardly elongated peak having a rear edge shaped to engage the forehead of a wearer above the eyes, said peak having side edges, rearward portions of the side edges of said peak having abbreviated depending portions serving as side shields said side shields comprising rearwardly extending portions to extend alongside of the sides of the forehead, temples, and cheeks of the wearer, and a lower shield extending between and connected to the lower edges of said side shields, said lower shield having a rear edge formed to engage the nose of the wearer, below the level of the eyes.

2. An eye shield comprising a forwardly elongated peak having a rear edge formed to engage the forehead of a wearer above the eyes, said peak having side edges, abbreviated side shields depending from said side edges at points intermediate the ends of said side edges, an abbreviated lower shield extending between and connected to the lower edges of said side shields having a rear edge formed to engage the nose of the wearer below the eyes, said side shields having rearwardly projecting extensions arranged to extend alongside of the sides of the forehead, temples, and cheeks of the wearer.

3. An eye shield comprising a forwardly elongated peak having a rear edge formed to engage the forehead of a wearer above the eyes, said peak having side edges, abbreviated side shields depending from said side edges at points intermediate the ends of said side edges, an abbreviated lower shield extending between and connected to the lower edges of said side shields having a rear edge formed to engage the nose of the wearer below the eyes, said side shields having rearwardly projecting extensions arranged to extend alongside of the sides of the forehead, temples, and cheeks of the wearer, the forward edge of said lower shield reaching to the forward edges of said side shields.

4. An eye shield comprising a forwardly elongated peak having a rear edge formed to engage the forehead of a wearer above the eyes, said peak having side edges, abbreviated side shields depending from said side edges at points intermediate the ends of said side edges, an abbreviated lower shield extending between and connected to the lower edges of said side shields having a rear edge formed to engage the nose of the wearer below the eyes, said side shields having rearwardly projecting extensions arranged to extend alongside of the sides of the forehead, temples, and cheeks of the wearer, said peak, side shields, and lower shield being formed of transparent material.

5. An eye shield comprising a forwardly elongated peak having a rear edge formed to engage the forehead of a wearer above the eyes, said peak having side edges, abbreviated side shields depending from said side edges at points intermediate the ends of said side edges, an abbreviated lower shield extending between and connected to the lower edges of said side shields having a rear edge formed to engage the nose of the wearer below the eyes, said side shields having rearwardly projecting extensions arranged to extend alongside of the sides of the forehead, temples, and cheeks of the wearer, said peak, side shields, and lower shield being formed of transparent material, coated on their inner sides to eliminate internal reflection.

6. An eye shield comprising a forwardly elongated peak having a rear edge formed to engage the forehead of a wearer above the eyes, said peak having side edges, abbreviated side shields depending from said side edges at points intermediate the ends of said side edges, an abbreviated lower shield extending between and connected to the lower edges of said side shields having a rear edge formed to engage the nose of the wearer below the eyes, said side shields having rearwardly projecting extensions arranged to extend alongside of the sides of the forehead, temples, and cheeks of the wearer, portions of said eye shield being formed of opaque material and other portions of transparent material.

CLYDE E. GARDNER.

REFERENCES CITED

The following references are of record in the file of this patent:

UNITED STATES PATENTS

| Number | Name | Date |
| --- | --- | --- |
| 1,109,398 | Butler et al. | Sept. 1, 1914 |
| 2,342,377 | Small | Feb. 22, 1944 |